Dec. 16, 1924.                                          1,519,428
                     J. A. WILISCH
        DEVICE FOR SEPARATING SOLID, LIQUID, OR SEMIGASEOUS
           MATTER FROM GASES, VAPORS, AND THE LIKE
                  Filed July 1, 1922      3 Sheets-Sheet 1

Julius Alexander Wilisch Inventor:

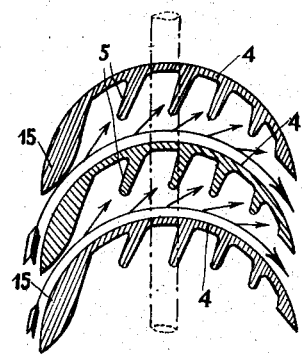
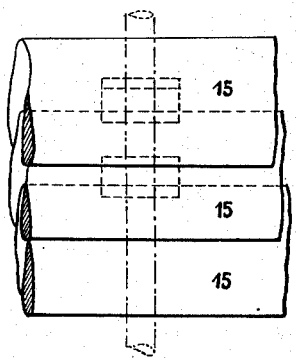
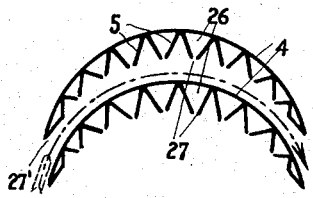
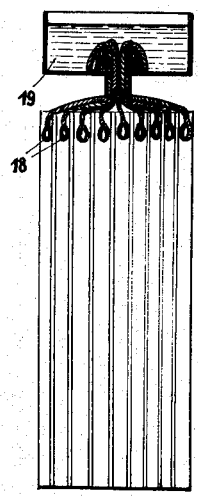
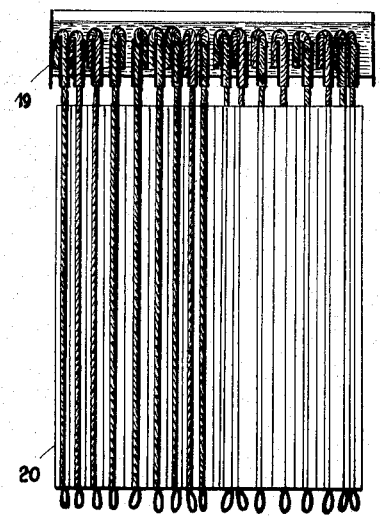
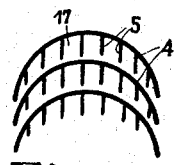
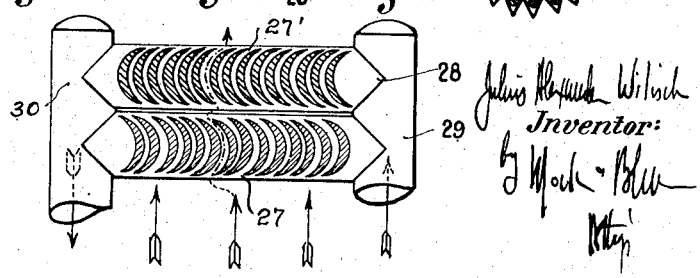

Dec. 16, 1924.  1,519,428
J. A. WILISCH
DEVICE FOR SEPARATING SOLID, LIQUID, OR SEMIGASEOUS
MATTER FROM GASES, VAPORS, AND THE LIKE
Filed July 1, 1922  3 Sheets-Sheet 3

Inventor:

Patented Dec. 16, 1924.

1,519,428

UNITED STATES PATENT OFFICE.

JULIUS ALEXANDER WILISCH, OF DEUTSCH-CATHARINENBERG, GERMANY.

DEVICE FOR SEPARATING SOLID, LIQUID, OR SEMIGASEOUS MATTER FROM GASES, VAPORS, AND THE LIKE.

Application filed July 1, 1922. Serial No. 572,303.

*To all whom it may concern:*

Be it known that I, JULIUS ALEXANDER WILISCH, of Deutsch-Catharinenberg, Saxony, Germany, have invented certain new and useful Improvements in Devices for Separating Solid, Liquid, or Semigaseous Matter from Gases, Vapors, and the like, of which the following is a specification.

The separation of solid, liquid or semigaseous matter from gases and vapors is of great importance in many fields of industry, for example in the desiccation of exhaust steam and compressed air from oil and water, in drying and straining live steam, in the purification and desiccation of the suction air for internal combustion engines or of the cooling or drying draughts for various industrial purposes, for the separation and collection of injurious or valuable contents from all kinds of gas or steam compounds, for the separation of sulphurous acid and soot particles from waste gases by irrigation or by the heat extracting processes employing air currents for the purpose, in short, for washing, purifying and scrubbing all kinds of gases either by irrigation or injection of a binding liquid, for deodorizing and regenerating waste air, and for many other purposes.

Devices have been proposed for these purposes, in which the incoming current of gas, air, steam or the like is caused to impinge upon baffle plates in order to effect a certain cooling action through impact, throttling and by passing the currents over large contacting surfaces, with the object of causing the separation of solid, liquid or semigaseous matter from such currents, whereby the process of precipitation is sometimes assisted by irrigation with a binding liquid. Other devices have been proposed in which the separation of the particles is effected by the gases or the like being passed through spiral passages in order to cause or assist the separation by centrifugal force. However, all these devices have a great disadvantage in that the pressure of the gases or vapors falls off very appreciably unless the said devices are of comparatively large dimensions.

According to this invention a device is provided in which the said drawback is absent and in which the loss in pressure of the gas is confined to a minimum, whilst the dimensions of the device itself may be kept within moderate limits in spite of having comparatively very large contacting surfaces. For this purpose guide bucket-shaped separating elements of crescent-shaped cross section are arranged in series above and beside one another so as to form undulating passages through which the medium (gas or liquid) is passed at great speed. On account of the guide bucket like formation of the elements bordering the said passages very little resistance is encountered to the flow of the medium which, however, is subjected to considerable centrifugal forces causing the relatively heavier particles to be deposited upon the surfaces of the separator elements above the passing stream of the medium, where they are thus collected and eventually discharged. In order to keep the separated particles out of the medium and to prevent their being again taken up by the latter, discharge channels are provided within the crescent circumscribing the cross sectional area of the elements, which channels may have a position normal or inclined to the passing stream of the gas or other medium. If desired, the guide bucket-shaped elements may be disposed at a angle to the direction of flow of the stream, so as to allow a downwardly directed driving force being obtained.

The accompanying drawings illustrate several constructional forms of the invention by way of example; the majority of the figures being largely diagrammatic.

Fig. 9 is a cross section and

Fig. 10 an elevation of a further modification of the vanes, particularly suitable for straining and drying steam.

Figs. 11 and 12 are part sectional elevation and cross section respectively of another type of vane for the purification and desiccation of atmospheric air.

Figs. 13 and 14 are similar illustrations of still another modification, showing two separator units arranged in series.

Figure 15:
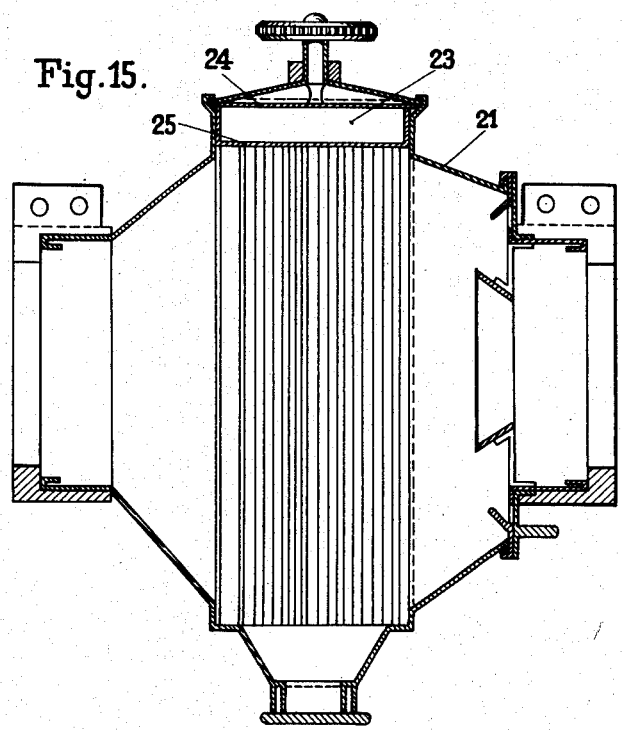

Fig. 15 is a part sectional elevation and

Figure 16:
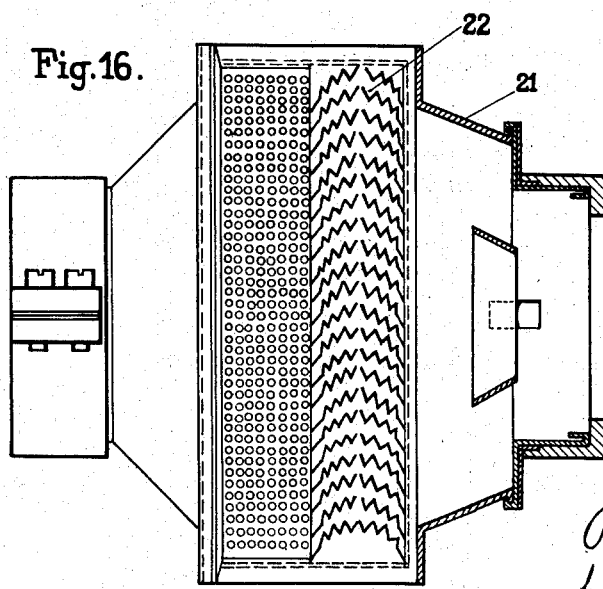

Fig. 16 a plan view, also partly sectioned, of a complete separator, such as would be suitable for the filtration and desiccation of air, especially for use on automobile internal combustion engines.

Fig. 17 shows in cross section two vanes for the separation of volatile and readily condensible contents from gas or vapor mixtures or compounds.

Fig. 18 illustrates the application of the separator vanes shown in Fig. 17 to the washing, binding or cooling liquid supply conduits.

Figure 1:
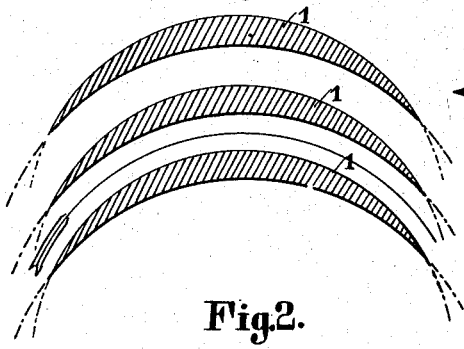
Fig. 1 illustrates the general arrangement of the guide bucket-shaped separator elements which, for convenience, will hereinafter be briefly referred to as "vanes."

As will be seen from Fig. 1 of the drawings the separator elements consist of vanes 1 of crescent-shaped cross section, between which the medium to be treated and which may be a gas, liquid or the like, is allowed to pass in the direction of the arrow. The crescent shape is such that the different curvatures of the opposing vane surfaces give to the stream an even or uniform cross section as regards curvature and length of arc. Experience has shown, that the flow of a medium through such guide buckets takes place on almost perfect lines, so that the loss of gas pressure remains very moderate. Owing to the diversion of the stream from the straight direction in which it enters the system, great centrifugal forces are set up, by which the solid and liquid particles of the medium, by reason of their greater relative weight, are caused to move to the concave side of the vanes to which they adhere and whence they are subsequently discharged at right angles or at an inclination to the direction of flow and longitudinally with regard to the elements. The elements are preferably assembled within the separator with their straight parallel sides either vertical or at a slight inclination, so as to form an obtuse angle with the vertical line, in order to cause the particles to be discharged vertically downwards.

Figure 2:
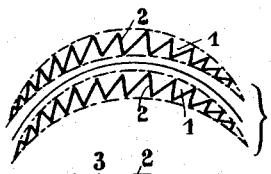
Figs. 2, 3, 4 and 5 are cross sections through four different types of vanes.

In the modification illustrated in Fig. 2 of the drawings the vanes are not of the solid crescent formation as they are shown in Fig. 1, but are made of sheet metal strips joined to form a kind of skeleton frame in such a manner, that the imaginary lines connecting the top and bottom edges of the elements or strips 1 enclose a crescent-shaped area. The parts of the channels, therefore, which are positioned between the individual ribs and which form discharge ways for the separated liquid, increase in size from the front edge of the vane towards the centre, beyond which they decrease progressively towards the rear edge of the same. The path of the stream is solely defined by the crescent-shaped boundary of the elements, whilst the serrations form only dead spaces into which the separated liquids or impurities discharge. Since the convex surfaces of the elements are not utilized for the separation of matter and therefore do not require the discharge channels, they may be made smooth by means of cover plates 3 (Fig. 3) in order to eliminate to the highest possible degree any resistance to the stream of the medium.

Figure 4:
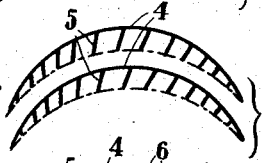

The modification of Fig. 4 shows a cast type of separator element. In this case the vane consists of a back 4 having inwardly projecting ribs 5 which, in order to obtain the desired crescent shape, are of decreasing size from the middle towards the edges of the vane.

Figure 5:

According to the example shown in Fig. 5 the flow of the medium may be further regulated by the provision of a grate at the concave side of the vane. This grate may be formed by a wire netting or by a perforated plate 6 of which the stampings 6' are bent up to form a rake which extends slightly into the stream of the passing medium.

Figure 6:
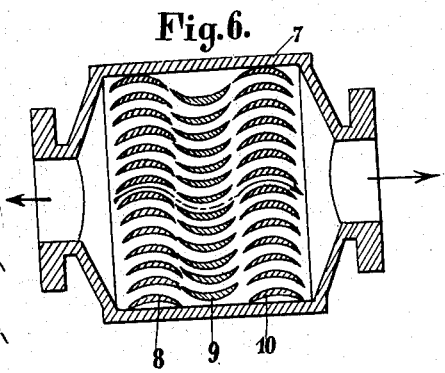
Fig. 6 shows an assembled separator in cross section.

Fig. 6 illustrates the arrangement of the separator vanes within a casing 7. It will be observed from the figure, that the first set 8 of the vanes is reversed with respect to the second set 9 which, in turn, is reversed with respect to the following set 10 but has the same direction as the set 8. By reason of this guide bucket-like disposition of the vanes the medium is caused to repeatedly change its course during its passage through the system, whereby the separating capacity of the latter is considerably increased. The individual elements, as mentioned above, are arranged with their straight sides substantially vertical in order to lead the particles which have collected on the concave sides of the vanes downwardly, or they may be disposed at a slight inclination so as to make an angle with the direction of flow in order to assist in the discharge of the specifically lighter deposits.

Figure 7:
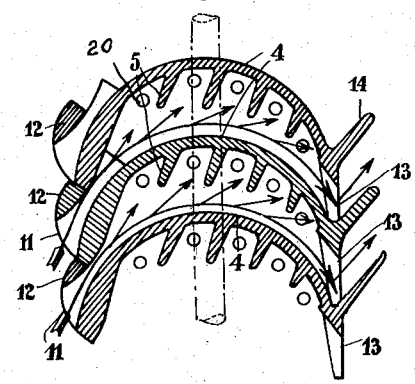
Fig. 7 is a more detailed cross section through one particular form of vane construction, such as would be especially adapted for the drying of steam if the wicks illustrated be removed.
Figure 8:
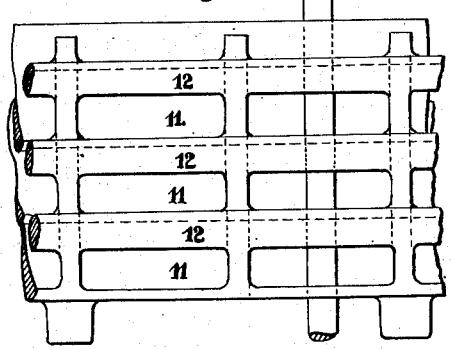
Fig. 8 is an elevation of Fig. 7.

Figs. 7 and 8 illustrate a further modified form of vanes which is particularly suitable for the drying and straining of steam and other vapors. The vanes are also crescent-shaped and consist of buckets 4 and downwardly projecting ribs 5 which latter diminish in height towards the ends of the vane. The construction of these elements is such that the entrances for the gas streams are in the form of broadened De Laval nozzles, extending in diffusor-like manner towards the separation chamber proper. By this arrangement the speed of the passing stream through the vanes is considerably increased and the separating effect of the latter improved. To produce the said jet-like entrances the bucket 4 of each vane is provided with short partitions 11 preferably having a cast-on guide bar 12 extending lengthways over the vane and serving at the same time as a support for the bucket 4 of the adjacent vane. At the opposite side of each bucket 4, vane supports 13 are provided in a similar manner, these shelves 14 serve to rake the stream of the medium as it leaves the vanes. By inserting the wicks 20 as indicated in Fig. 7, the apparatus could be used for desiccating air.

The construction of the vanes shown in Figs. 9 and 10 differs from the one just described in that the front edges of the buckets 4 are thickened and bulge out inwardly so as to form a De Laval nozzle-like passage in conjunction with the adjacent element. The width of the jet may be adjusted to suit various purposes by wedge pieces 15 or the like (Fig. 10).

The arrangement of Figs. 11 and 12 illustrates an element which is particularly suited for the purification and desiccation of atmospheric air. Owing to the crescent shape of the vanes it offers very little resistance to the passing air currents and yet is capable of effecting a thorough purification of the air, especially from dust particles which, in the hitherto known devices, are easily taken up again and rushed through the system. In this form of the invention wicks, or suction pads 18, are arranged within the chamber 17 formed between the buckets 4 and the ribs 5, which wicks are permanently or periodically saturated from a liquid container 19. The liquid used is preferably one which will not evaporate at normal atmospheric temperature and which is capable of absorbing the moisture contained in the air. Fig. 11 shows how the liquid is allowed to drip from the ends of the wicks into and along the channels 17, where it binds all dust and impurities set up there by the centrifugal force of the passing air currents in order to eventually discharge them downwardly. Such moistened wicks or pads could be combined if desired, with the other forms herein described.

Figs. 13 and 14 illustrate similar elements serving the same purpose and arranged in series. The elements, in this case, are made of folded sheet metal and have long wicks 20 passing down the collecting channels, said wicks being supplied with liquid from a container 19 or from a saturated pad or the like.

In Figs. 15 and 16 a complete air strainer is shown which is especially suitable for straining the combustion air for automobile and like engines. The elements 22 which are of the form shown in Figs. 11 to 14 are arranged within a casing 21. The liquid which is used to bind and carry away the matter set up in the channels of the vanes is supplied from a si ve-bottomed container 23 of the casing 21, in which a saturated pad or absorbing material 25 is arranged and pressed upon either permanently or periodically by a regulatable pressure plate 24, a hand wheel 24' serving to move said plate up and down as required.

In Fig. 17 is shown an element which serves to wash, separate and collect the more volatile and easily condensing parts from gas or vapor compounds or mixtures. For this purpose the ribs 5 which, also in this case, diminish in height from the centre towards the ends of the vanes are made so as to form chambers 26, through which a binding, washing or cooling medium is passed. The said chambers communicate with the separating chamber of the element by means of openings 27, through which the said binding, washing or cooling medium enters and which thereby encounters the more volatile and easily condensible particles and condenses same, to be eventually driven into the collecting channels by the force of the stream, whence it moves downwardly, thereby carrying the separated impurities with it. An important feature of this modification consists in that openings 27' are provided at the front edges of the vanes, through which a quantity of washing, binding or cooling liquid is forced against the incoming stream of the gas, vapors or the like, in order to condense the volatile parts of the same as far as possible already at the entrance to the vanes.

Fig. 18 shows the arrangement of vanes of the kind shown in Fig. 17 upon tubes 28, to which the washing, binding or cooling liquid is introduced by means of a supply conduit 29 and discharged by a similar conduit 30, except, of course, that amount of liquid which has already left the system through the openings 27 and 27' of the vanes.

Elements of crescent-shaped cross section as illustrated in Figs. 1 to 5 may also be used with great advantage for the isolation or suspension of either valuable or undesirable contents of gases or gas mixtures in contact processes which are already used in the chemical industry instead of brushing the gas in gridworks. Considerably better effects and smaller dimensions of the apparatus used are obtained in this way. The solid vanes may be pressed out of suitable contact material or they may be in the form of a crescent-shaped casing filled with such material, or of a ribbed or reinforced frame into which the said material is pressed. It is further of advantage to make the said vanes interchangeable so as to renew or recover them by heating, airing or in any other way.

Figure 3:
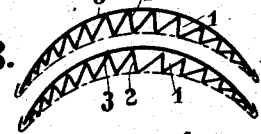

When assembling the solid crescent elements and the hollow crescent elements of the types shown in Figs. 1 and 3 in the manner illustrated in Figs. 17 and 18 and so as to form what may be termed a closed laminated tube system, and when the two different temperatures acting from within and without are thus caused to compensate each other at the contact surfaces (whereby the separating effect of the system is assisted by the addition and the removal of heat), an effective combination of a separator and a laminated heater, or cooler respectively, is obtained in which both processes, namely the separation of matter from gases and the heating, or cooling respectively, are considerably improved.

What I claim is:—

1. In a device for separating solid, liquid or semi-gaseous matter from gases, vapors and the like, a number of separator elements of crescent-shaped cross section and passages between the opposed concave and convex curvatures of each two superposed elements, said passages being of substantially even cross section throughout.

2. In a device for separating solid, liquid or semi-gaseous matter from gases, vapors and the like, a number of separator elements of crescent-shaped cross section and passages between the elements having substantially even cross sections throughout their lengths, said elements being arranged in successive rows and so that the curvature of the elements in one row is reversed with regard to the curvature of the elements in the adjacent row.

3. A device for the separation of solid, liquid or semi-gaseous matter from gases, vapors and the like, comprising separator elements of substantially crescent-shaped cross section and having their concave sides ribbed to form collecting channels for the separated matter.

4. A device for the separation of solid, liquid or semi-gaseous matter from gases, vapors and the like, comprising separator elements of substantially crescent-shaped cross section and having their concave sides provided with ribs which diminish in height from the centre of the element towards the edges thereof.

5. In a device for the separation of solid, liquid or semi-gaseous matter from gases, vapors and the like, especially for drying and desiccating vapors, a number of separator elements, each comprising a curved body, inwardly projecting ribs and channels between the said ribs; said ribs and said channels being of diminishing size from the centre towards the ends of the elements, the height of the ribs thereby being such as to give the entire element a cross section of substantially crescent-shaped formation.

5. In a device for the separation of solid, liquid and semi-gaseous matter from gases, vapors and the like, especially for drying and desiccating vapors, a number of separator elements, each comprising a curved body, inwardly projecting ribs and channels between the said ribs; said ribs and said channels being of diminishing size from the centre towards the ends of the elements, and De Laval nozzle like passages at the front edges of and between each two superposed elements extending inwardly in diffusor-like manner.

7. In a device for the separation of solid, liquid and semi-gaseous matter from gases, vapors and the like, especially for drying and desiccating vapors, a number of separator elements, each comprising a curved body, inwardly projecting ribs and channels between the said ribs, said ribs and said channels being of diminishing size from the centre towards the ends of the elements, De Laval nozzle-like passages at the front edges of and between each two superposed elements, and a raking shelf at the discharge end of each element projecting into the way of the passing stream of the medium.

8. In a device for the separation of solid, liquid and semi-gaseous matter from fluids, a number of separator elements, each comprising a curved body, inwardly projecting ribs integral with said body, channels between the ribs and of diminishing depth from the centre towards the ends of the elements, a bar extending along the front edge of the element at a short distance thereof and shaped so as to form a jet-like passage with the said front edge and partitions connecting the said bar to the element, the bar and the partitions of one element thereby serving as a support for its superposed element.

9. In a device for separating undesirable matter from fluids, especially for straining and desiccating atmospheric air, a number of separator elements of substantially crescent-shaped cross section, passages for the stream of the medium provided between said elements, ribs along the concave side of the crescents, channels between the said ribs and enclosed within the crescent-shaped boundary of the elements, a supply tank and wicks located in said tank and located in the said channels.

10. A device for the separation of solid, liquid and semi-gaseous matter from gases, vapors and the like, especially for condensing, washing and separating volatile and easily condensible contents of gas mixtures, vapors and air, comprising bucket-shaped elements, ribs provided at the concave sides of the buckets and forming chambers between them for the passage of binding, cooling and washing mediæ and the like, perforations in the chambers through which the said mediæ may enter the chambers, and a front opening for admitting of a liquid to be forced against the flow of the current to be treated.

In witness whereof I affix my signature.

JULIUS ALEXANDER WILISCH.